United States Patent
Wagner et al.

[15] 3,666,755
[45] May 30, 1972

[54] 2-IMIDAZOLYLBICYCLO[2.2.2]OCTANES

[72] Inventors: Arthur F. Wagner, Princeton; Paul E. Wittreich, Tenafly; Lewis H. Sarett, Skillman, all of N.J.

[73] Assignee: Merck & Co., Inc., Rahway, N.J.

[22] Filed: Mar. 26, 1970

[21] Appl. No.: 23,023

[52] U.S. Cl. ........................260/240 F, 260/240 J, 260/309, 260/453 R, 260/464, 260/465 F, 260/557 B, 260/564 A, 424/273
[51] Int. Cl. .........................................................C07d 49/36
[58] Field of Search..........................260/240 F, 240 J, 309

[56] References Cited

UNITED STATES PATENTS 3,438,937   4/1969   Christie ...................................260/47

Primary Examiner—Henry R. Jiles
Assistant Examiner—G. Thomas Todd
Attorney—Francis H. Deef, Harry E. Westlake, Jr. and I. Louis Wolk

[57] ABSTRACT

Novel bicyclo[2.2.2]octanes and their process of preparation are described. These compounds exhibit inhibition of blood platelet aggregation.

43 Claims, No Drawings

2-IMIDAZOLYLBICYCLO[2.2.2]OCTANES

SUMMARY OF THE INVENTION

This invention relates to novel 5-endo-(2-imidazolyl)bicyclo[2.2.2]octanes and describes processes for preparing these compounds. The compounds of this invention exhibit inhibition of blood platelet aggregation.

BACKGROUND OF THE INVENTION

Diels-Alder condensations to yield bicyclo[2.2.2]-octanes have been described in the literature. However, the relatively poor dienophilic nature of vinylimidazoles and their propensity to polymerize at relatively low temperature does not augur well for a successful Diels-Alder condensation. Further, 5-endo-(2-imidazolyl)bicyclo[2.2.2]-octanes have not been described before.

The normal repair mechanism of the vascular bed undergo certain pathological conditions which result in blood clotting. The prevention of this clotting is considered to be of therapeutic importance.

DESCRIPTION AND PREFERRED EMBODIMENTS

This invention describes new chemical compounds which contain a rigid bicyclic framework, an imidazole nucleus, and a functional group drawn from among those found in naturally occurring compounds.

More particularly, this invention describes a new class of chemical compounds of structural formulas I–III:

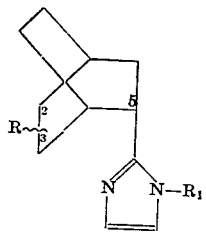

where I

R is a double bond between the 2- and 3-positions or a substituent at the 2- or 3-position and is hydrogen, hydroxy, keto, oximino, amino, ureido, —$CH_2R'$ where R' is cyano, aminomethyl, carbamyl, carbalkoxy (preferably carbloweralkoxy from one to five carbon atoms), hydroxymethyl, mercaptomethyl, acetyl, benzoyl, p-alkoxyphenyl (preferably methoxy), p-hydroxyphenyl, 2-imidazolyl or = CHR'' where R'' is cyano, carbamyl, carbalkoxy, benzoyl, p-alkoxyphenyl or p-hydroxyphenyl; and $R_1$ is hydrogen, alkyl (preferably lower alkyl from one to five carbon atoms), aralkyl (preferably benzyl), acetyl, carbalkoxy (preferably carbloweralkoxy from 1-5 carbon atoms), cyano or haloalkyl (preferably fluoromethyl).

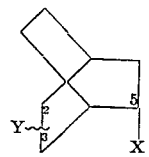

where II

Y is in the 2- or 3- position and is OH, keto, or a double bond between the 2- to 3-position of the ring; and X is carbamyl, carbiminoalkoxy (preferably lower alkoxy from one to five carbon atoms), N-(β,β-dialkoxyethyl)carbamidino or cyano, provided Y is not a double bond.

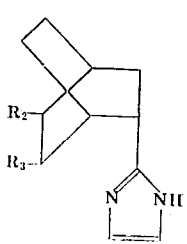

where III $R_2$ is hydroxy, keto or cyanomethylidenyl; and $R_3$ is —$CH_2R'$ or = CHR'' where R' and R'' are p-alkoxyphenyl or p-hydroxyphenyl.

The more preferred compounds of this invention embrace those compounds of structural formula I in which $R_1$ is hydrogen. The most preferred compounds are those in which the 5-substituent is in the endo configuration.

The compounds of this invention may exist in the endo and exo configurations. The designation endo means that the substituent is directed toward the bridgehead containing the other functional group. Exo means the substituent is oriented away from the bridgehead containing the other functional group.

It is well known in the pharmacological arts that non-toxic acid addition salts of pharmacologically active compounds do not differ in activities from their free base. The salts merely provide a convenient solubility factor.

The products of this invention may be readily converted to their non-toxic acid addition salts by customary methods in the art. The non-toxic salts of this invention are those salts the acid component of which is pharmacologically acceptable in the intended dosages; such salts would include those prepared from hydrochloric acid, hydrobromic acid, sulfuric acid, nitric acid, phosphoric acid, methane sulfonic acid, acetic acid, propionic acid, oxalic acid, glycolic acid, lactic acid, salicylic acid, etc.

Products of this invention contain asymmetric carbon atoms and therefore are obtained as mixtures of optical isomers. These can be separated by any of the various known methods of resolution. It is to be understood that the said isomers are embraced within the scope of this invention. Other products that also contain an ethylenic linkage are obtained as mixtures of geometrical (cis and trans) isomers. These too are embraced within the scope of this invention.

Representative compounds of this invention are as follows:

5-endo-carbiminomethoxybicyclo[2.2.2]-oct-2-ene hydrochloride

N-(β,β-diethoxyethyl)-5-endo-carbamidinobicyclo[2.2.2]-oct-2-ene hydrochloride 5-endo-(2-imidazolyl)bicyclo[2.2.2]-oct-2-ene 2-(2-imidazolyl)bicyclo[2.2.2]octane 2-keto-5-endo-(2-imidazolyl)bicyclo[2.2.2]octane 2-hydroxy-5-endo-(2-imidazolyl)bicyclo[2.2.2]octane 2-cyanomethylidenyl-5-endo-(2-imidazolyl)bicyclo[2.2.2]-octane 2-oximino-5-endo-(2-imidazolyl)bicyclo[2.2.2]octane 2-amino-5-endo-(2-imidazolyl)bicyclo[2.2.2]octane 2-ureido-5-endo-(2-imidazolyl)bicyclo[2.2.2]octane 2-cyanomethyl-5-endo-(2-imidazolyl)bicylo[2.2.2]octane 2-(β-aminoethyl)-5-endo-(2-imidazolyl)bicyclo[2.2.2]octane 2-(2-imidazolylmethyl)-5-endo-(2-imidazolyl)bicyclo[2.2.2]-octane 2-acetonyl-5-endo-(2-imidazolyl)bicyclo[2.2.2]octane 2-carbethoxymethylidenyl-5-endo-(2-imidazolyl)bicyclo-[2.2.2]octane 2-carbethoxymethyl-5-endo-(2-imidazolyl)bicyclo[2.2.2]octane 2-(β-mercaptoethyl)-5-endo-(2-imidazolyl)bicyclo[2.2.2]-octane 2-(β-hydroxyethyl)-5-endo-(2-imidazolyl)bicyclo[2.2.2]octane 2-benzoylmethylidenyl-5-endo-(2-imidazolyl)bicyclo[2.2.2]-octane 2-carbamylmethylidenyl-5-endo-(2-imidazolyl)bicyclo[2.2.2]-octane 2-(p-methoxybenzylidenyl)-5-endo-(2-imidazolyl)bicyclo-[2.2.2]octane 2-(p-methoxybenzyl)-5-endo-(2-imidazolyl)bicyclo[2.2.2]-octane 3-endo-hydroxy-5-endo-carbamylbicyclo[2.2.2]octane 3-keto-5-endo-carbamylbicyclo[2.2.2]octane 3-keto-5-endo-cyanobicyclo[2.2.2]octane 3-keto-5-endo-carbiminomethoxybicyclo[2.2.2]octane hydrochloride 3-keto-5-endo(2-imidazolyl)bicyclo[2.2.2]octane 3-hydroxy-5-endo-(2-imidazolyl)bicyclo[2.2.2]octane 3-amino-5-endo-(2-imidazolyl)bicyclo[2.2.2]octane 3-cyanomethylidenyl-5-endo-(2-imidazolyl)bicyclo[2.2.2]-octane 3-cyanomethyl-5-endo-(2-imidazolyl)bicyclo[2.2.2]octane
3-(β-aminoethyl)-5-endo-(2-imidazolyl)bicyclo[2.2.2]octane
3-(β-hydroxyethyl)-5-endo-(2-imidazolyl)bicyclo[2.2.2]octane
3-(β-mercaptoethyl)-5-endo-(2-imidazolyl)bicyclo[2.2.2]-octane
3-acetonyl-5-endo-(2-imidazolyl)bicyclo[2.2.2]octane
3-carbamylmethylidenyl-5-endo-(2-imidazolyl)bicyclo[2.2.2]-octane
3-carbethoxymethylidenyl-5-endo-(2imidazolyl)bicyclo-[2.2.2]octane
3-carbethoxymethyl-5-endo-(2-imidazolyl)bicyclo[2.2.2]octane
3-carbamylmethyl-5-endo-(2-imidazolyl)bicyclo[2.2.2]octane
2-keto-3-(p-hydroxybenzylidenyl)-5-endo-(2-imidazolyl)bicyclo[2.2.2]octane
2-keto-3-(p-methoxybenzylidenyl)-5-endo-(2-imidazolyl)bicyclo[2.2.2]octane
2-hydroxy-3-(p-methoxybenzyl)-5-endo-(2-imidazolyl)bicyclo-[2.2.2]octane
2-cyanomethylidenyl-3-(p-methoxybenzylidenyl)-5-endo-(2-imidazolyl)bicyclo[2.2.2]octane Following injury of the vascular bed, platelets aggregate and adhere to the exposed collagen. During this process, they release intercellular constituents which accelerate this process and in the end, result in the loss of platelet structure. Factors are released which promote coagulation of the circulating blood fibrinogen and fibrin is formed which serves as a cement substance for the platelet aggregates. This process serves as a normal repair mechanism but under certain conditions pathological clotting occurs which may lead to thrombosis or thromboembolism. The prevention of pathological coagulation is of great importance and compounds which interfere with this process would be of great therapeutic value.

Oral anticoagulants prevent the clotting of fibrinogen but do not interfere with platelet aggregation. Compounds which prevent the first phase of coagulation, that is platelet aggregation, should therefore be the aim of research. The compounds of the present invention interfere with the formation of platelet aggregation and therefore are considered to be therapeutically effective.

2-Substituted Analogs 5-endo-Cyanobicyclo[2.2.2]-oct-2-ene(1) is reacted with an alcohol and anhydrous hydrogen chloride. An inert medium is convenient since the product precipitates and yields 5-endo-carbiminomethoxybicyclo[2.2.2]-oct-2-ene hydrochloride (2). Reaction of (2) with β-aminoacet-aldehyde diethylacetal yields N-(β,β-diethoxyethyl)-5-endo-carbamidinobicyclo[2.2.2]-oct-2-ene hydrochloride (3) which on treatment at a raised temperature (preferably reflux) in glacial acetic acid-acetic anhydride yields 5-endo-(2-imidazolyl)bicyclo[2.2.2]-oct-2-ene (4). Oxidation of (4), preferably with palladium chloride in an aqueous medium, gives 2-keto-5-endo-(2-imidazolyl)bicyclo[2.2.2]octane (5).

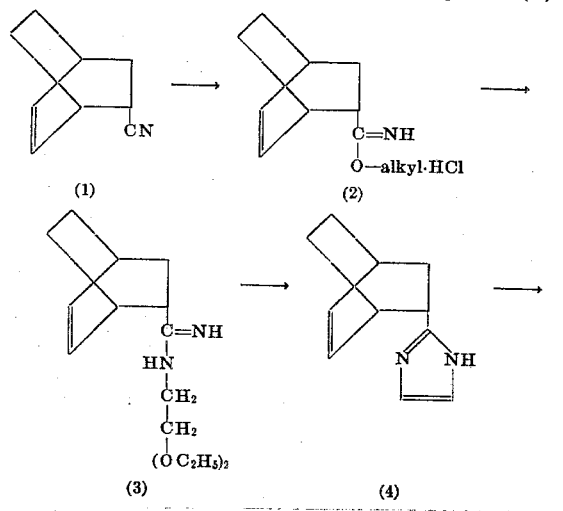

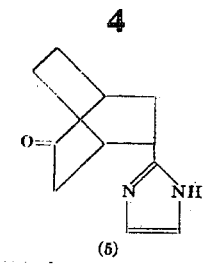

The ketone (5) is converted to the corresponding 2-hydroxy analog by catalytic hydrogenation or by chemical reduction. The 2-amino analog (7) is prepared by converting the 2-keto analog (5) to the oxime followed by reduction, and the 2-ureido analog (8) is synthesized by treating the 2-amino analog (7) with nitrourea or by fusion with urea.

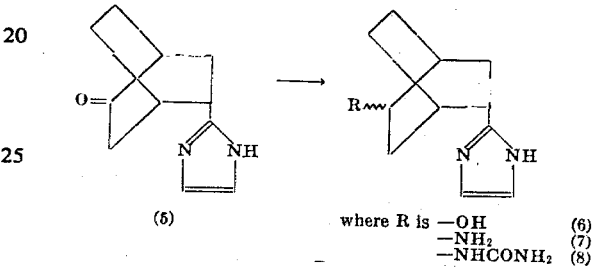

The 2-(substituted-methylidenyl) analogs (9–13) are prepared by condensing the 2-keto analog (5) with the appropriate dialkyl substituted-alkyl phosphonate in the presence of sodium hydride and an inert solvent such as dimethylformamide or 1,2-dimethoxyethane. Catalytic reduction of these products yields the corresponding 2-substituted-methyl analogs (14, 18 and 21).

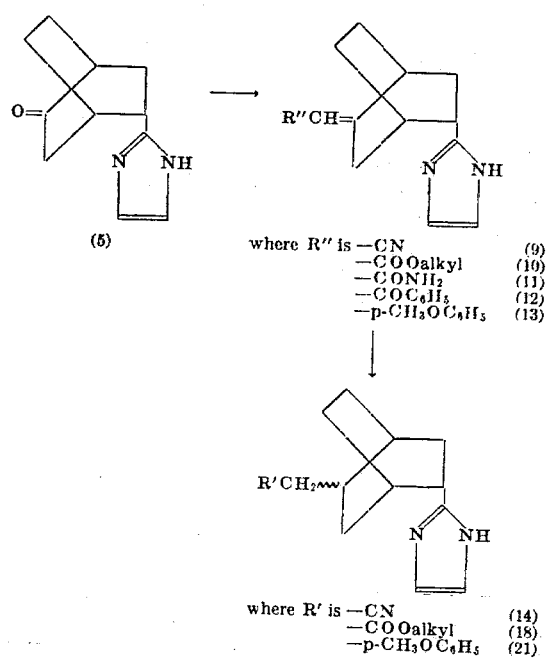

The 2-cyanomethyl analog (14) is converted to the 2-β-aminoethyl analog (15) by reduction and the 2-acetonyl analog (16) by reaction with methyl lithium in the presence of an inert solvent. The 2-(2-imidazolyl)analog (17) is prepared from the 2-cyanomethyl analog (14) in three steps: (a) conversion to the imino ester analog by treatment with methanol and anhydrous hydrogen chloride, (b) treatment of the derived imino ester with β-aminoacet-aldehyde diethylacetal, and (c) treatment of the product from (b) with acetic acid-acetic anhydride at raised temperature (preferably reflux).

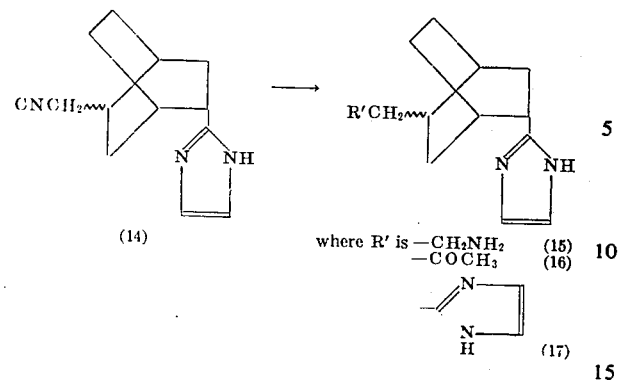

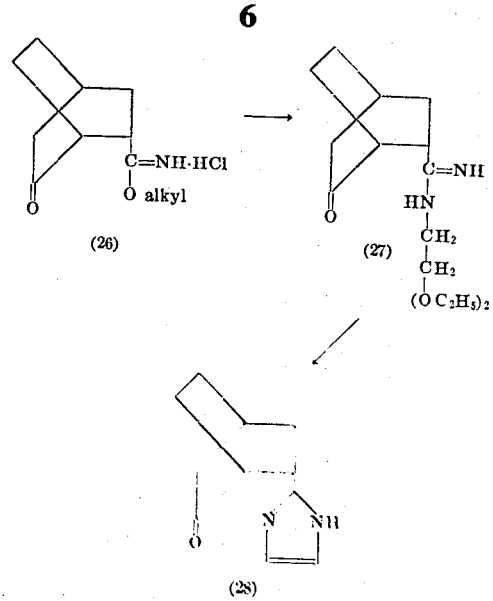

The 2-(β-hydroxyethyl) analog (19) is obtained from the 2-carbethoxymethyl analog (18) by reduction with lithium aluminum hydride in an inert solvent. The 2-(β-mercaptoethyl) analog (20) is synthesized from the 2-(β-hydroxyethyl) derivative by treatment with thiourea in hydrobromic acid solution, followed by hydrolysis in aqueous sodium hydroxide.

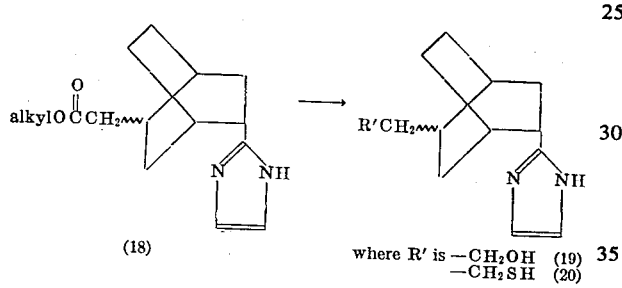

3-Substituted Analogs

Ammonolysis of the lactone moiety in 3-endo-hydroxy-5-endo-carboxybicyclo[2.2.2]octane lactone (22) yields 3-endo-hydroxy-5-endo-carbamylbicyclo[2.2.2]octane (23) which on chromic acid oxidation gives 3-keton-5-endo-carbamylbicyclo[2.2.2]octane (24). Dehydration of the carbamyl moiety in (24) with p-toluenesulfonyl chloride in pyridine gives 3-keto-5-endo-cyanobicyclo[2.2.2]octane (25). Treatment of the keto nitrile derivative (25) with methanol and anhydrous hydrogen chloride in ether solution gives 3-keto-5-endo-(carbiminomethoxy)bicyclo[2.2.2]octane hydrochloride (26). The derivative (26) on treatment with β-aminoacetaldehyde diethylacetal yields an intermediate (27), which, after treatment with hydrochloric acid (preferably dilute) yields 3-keto-5-endo-(2-imidazolyl)bicyclo[2.2.2]-octane (28).

At this point, the reaction sequence parallels that of the 2-substituted analogs with two exceptions. The 3-carbamylmethylidenyl derivative (33) is synthesized from the 3-cyanomethylidenyl analog (31) by acid hydrolysis, and the 3-cyanomethyl derivative (35) is prepared from the 3-carbamylmethyl analog (34) by dehydration with p-toluene-sulfonyl chloride and pyridine.

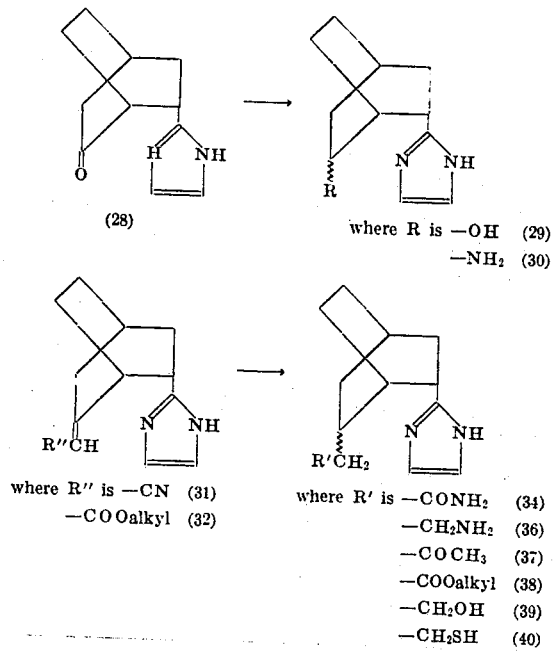

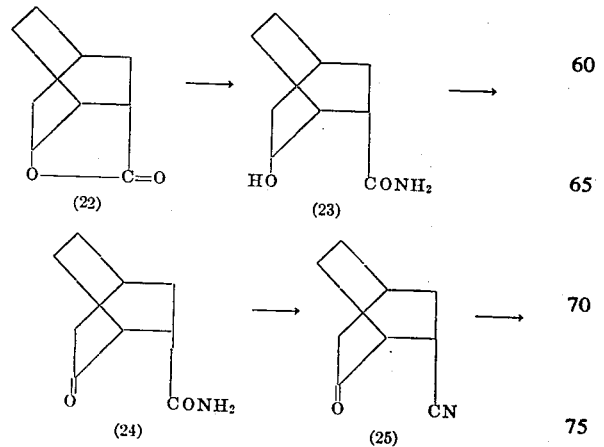

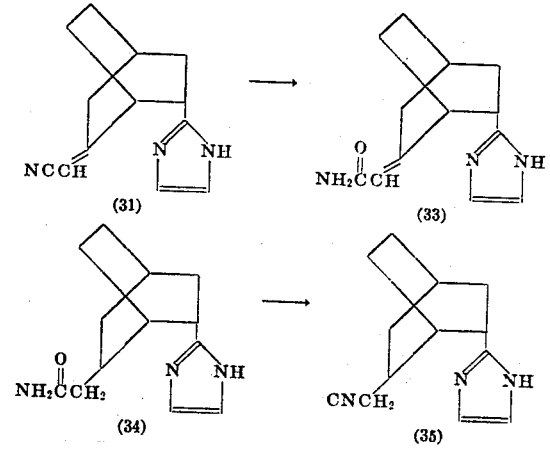

2 and 3 Disubstituted Analogs

For the synthesis of the 2,3-disubstituted derivatives for formula III, the 2-keto-5-endo-(2-imidazolyl)bicyclo[2.2.2]octane (5) is condensed with p-alkoxybenz-aldehyde in the presence of base to yield 2-keto-3-(p-alkoxybenzylidenyl)-5-endo-(2-imidazolyl)bicyclo[2.2.2]-octane (41). This may then be converted to the 3-(p-hydroxybenzylidenyl) analog (42) on fusion with pyridine hydrochloride. The cyanomethylidenyl analog (43) may be prepared by a phosphonate modification of the Wittig reaction on the 2-keto-3-(p-alkoxybenzylidenyl)-5-endo-(2-imidazolyl)bicyclo[2.2.2]octane, which may also be converted to the 3-(p-hydroxybenzylidenyl) analog (44) as above. The saturated 2-hydroxy analogs (45 and 46) may be prepared by reduction of the corresponding 2-keto compounds (41 and 42).

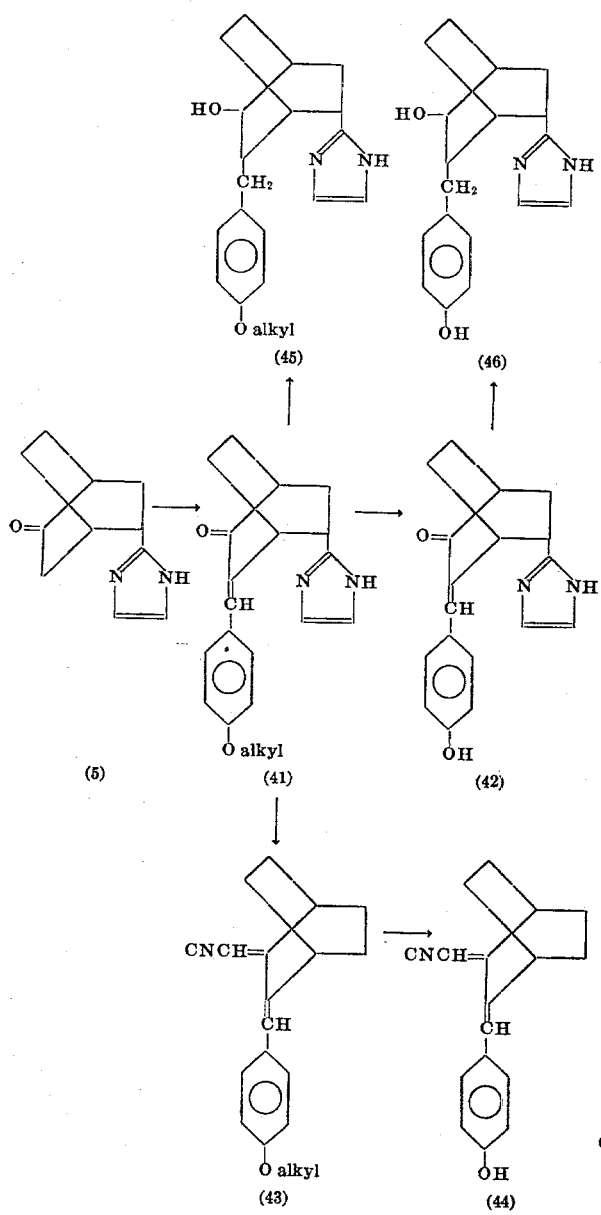

Reaction of the 2-imidazolyl compounds with a base activates the secondary nitrogen atom of the ring. Addition of an aliphatic or aromatic agent such as an aliphatic tosylate or halide or a cyanohalide results in the N-substituted products.

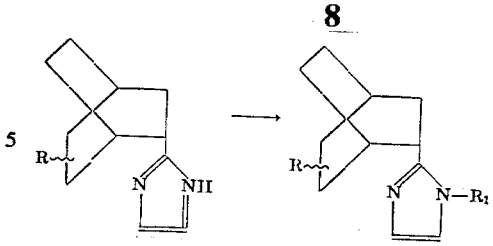

where R and $R_1$ are as described above.

The products of this invention may be readily converted to their non-toxic acid addition salts by customary methods in the art in order to provide a convenient solubility factor. The non-toxic salts of this invention comprise those salts containing acid components which are pharmacologically acceptable in the intended dosages. Such salts would include those prepared from hydrochloric acid, hydrobromic acid, sulfuric acid, nitric acid, phosphonic acid, methansulfonic acid, acetic acid, propionic acid, glycolic acid, lactic acid, salicylic acid, etc.

The following are a group of detailed examples which show the preparation of desired compounds of this invention. They are to be construed as illustrations of the invention and not as limitations thereof.

EXAMPLE 1

5-endo-Carbiminomethoxybicyclo[2.2.2]oct-2-ene Hydrochloride

A solution of 2 g. (62 millimoles) of methanol and 8.3 g. (62 millimoles) of 5-endo-cyanobicyclo[2.2.2]-oct-2-ene [prepared according to the procedure outlined in K. Alder, H. Heimback, and R. Reubke, Chem. Ber. 91, 1516 (1958)] in 18 ml. of anhydrous ether is cooled, and 2.3 g. of anhydrous hydrogen chloride in ether is added. After being allowed to stand overnight at 5° C., the mixture is filtered yielding 6.6 g. of 5-endo-carbiminomethoxy-bicyclo-[2.2.2]oct-2-ene hydrochloride (m.p. 165°–167°).

EXAMPLE 2

N-($\beta,\beta$-Diethoxyethyl)-5-endo-carbamidinobicyclo[2.2.2]-oct-2-ene Hydrochloride A suspension of 40 g. (0.2 mole) of 5-endo-carbiminomethoxybicyclo[2.2.2]oct-2-ene hydrochloride in 87 ml. of methanol is warmed to 30°C. and 27.4 g. (0.21 mole) of $\beta$-aminoacetaldehyde diethylacetal is added rapidly. The temperature of the suspension rises to 51° C., and the mixture becomes clear. After 1 hour, the solution is concentrated under reduced pressure yielding 62.3 g. of product.

EXAMPLE 3

5-endo-(2-Imidazolyl)bicyclo[2.2.2]oct-2-ene

A solution of 62.3 g. (0.2 mole) of N-($\beta,\beta$-diethoxyethyl)-5-endo-carbamidinobicyclo[2.2.2]oct-2-ene in 260 ml. of acetic acid and 111 ml. of acetic anhydride is heated at 120° for 2 hours. The reaction mixture is concentrated under reduced pressure, and the product is dissolved in 270 ml. of 2.5 N hydrochloric acid. The acidic solution is washed with ether, made alkaline with 50 percent potassium hydroxide, and extracted with chloroform. The chloroform extract is washed with water, dried over magnesium sulfate, filtered, and concentrated under reduced pressure. The residue is taken up in a small volume of chloroform, and absorbed on 500 g. of silica gel packed in methylene chloride. The product is eluted with 0.5 percent methanol in methylene chloride and recrystallized from 100 ml. of benzene-petroleum ether yielding 20.95 g. of 5-endo-(2-imidazolyl)bicyclo[2.2.2]oct-2-ene (m.p. 165°–167°C.).

EXAMPLE 4

2-(2-Imidazolyl)bicyclo[2.2.2]octane

A solution of 1.74 g. of 5-endo-(2-imidazolyl)-bicyclo[2.2.2]oct-2-ene in 25 ml. of acetic acid is reduced over 0.5 g.

of 5 percent palladium-on-carbon at room temperature. The mixture is filtered and concentrated and the residue is taken up in chloroform. The chloroform solution is washed with potassium bicarbonate, dried over magnesium sulfate, filtered, and concentrated, yielding a 1.7 g. residue. Recrystallization of the product from ethyl acetate gives 0.8 g. of 2-(2-imidazolyl)bicyclo-[2.2.2]octane (m.p. 191°–192°).

EXAMPLE 5

2-Keto-5-endo-(2-imidazolyl)bicyclo[2.2.2]octane

A mixture of 14.5 g. (83 millimoles) of 5-endo-(2-imidazolyl)bicyclo[2.2.2]oct-2-ene, 10 g. of palladium chloride and 14.5 g. of $CuCl_2 \cdot 2H_2O$ in 170 ml. of N hydrochloric acid and 900 ml. of water is stirred and heated at 70°–80° C. for 1 hour while air is bubbled through the solution continuously. The hot solution is filtered and cooled, and 140 g. of $Na_4(EDTA)$ is added. The solution is extracted five times with chloroform, and the combined extracts are dried over magnesium sulfate, filtered, and concentrated under reduced pressure yielding an 8.2 g. residue. The product is adsorbed on silica gel packed in methylene chloride, eluted with 1–2 percent methanol in methylene chloride, and recrystallized from chloroform-ether yielding 7.9 g. of 2-keto-5-endo-(2-imidazolyl)bicyclo[2.2.2]octane (m.p. 194°–196° C.).

EXAMPLE 6

2-Hydroxy-5-endo-(2-imidazolyl)bicyclo[2.2.2]octane

A solution of 200 mg. (1.1 millimoles) of 2-keto-5-endo-(2-imidazolyl)bicyclo[2.2.2]octane in 10 ml. of methanol is reduced over one-eighth tsp. of Raney nickel at room temperature under 1,800 lbs. in.$^2$ of hydrogen for 3 hours. The mixture is filtered and concentrated under reduced pressure yielding a 213 mg. residue which on recrystallization from methanol-ether-petroleum ether yields 133 mg. of 2-hydroxy-5-endo-(2-imidazolyl)biyclo-[2.2.2]octane (m.p. 158°–168° C., dec.).

Alternatively, reduction of 174 mg. (0.9 millimole) of 2-keto-5-endo-(2-imidazolyl)bicyclo-[2.2.2]octane with 100 mg. of sodium borohydride in 3 ml. of ethanol yields 100 mg. of 2-hydroxy-5-endo-(2-imidazolyl)bicyclo-[2.2.2]octane (m.p. 166°–168° C.)

EXAMPLE 7

2-Oximino-5-endo-(2-imidazolyl)bicyclo[2.2.2]octane

A mixture of 20 g. of 2-keto-5endo-(2-imidazolyl)bicyclo[2.2.2]octane and 20 g. of $NH_2OH \cdot HCl$ in 300 ml. of ethanol is heated under reflux for 1 hour and concentrated under reduced pressure. After the residue is taken up in water and the solution is made alkaline with concentrated ammonium hydroxide, the product is isolated by filtration yielding 23.1 g. of 2-oximino-5-endo-(2-imidazolyl)bicyclo[2.2.2]octane (m.p. 233°–235° C.).

EXAMPLE 8

2-Amino-5-endo-(2-imidazolyl)bicyclo[2.2.2]octane

A solution of 25 g. of 2-oximino-5-endo-(2-imidazolyl)bicyclo[2.2.2]octane in 900 ml. of N hydrochloric acid is reduced over 12 g. of platinum. After the mixture is filtered and concentrated under reduced pressure, the residue is triturated six times with ether and then with isopropyl alcohol yielding 13.6 g. of the amine hydrochloride. Ten grams of the hydrochloride is dissolved in 50 ml. of water and the solution is made alkaline with 2.5 N sodium hydroxide, saturated with sodium sulfate and extracted with chloroform. Concentration of the combined extracts yields 6.8 g. of product, which on recrystallization from chloroform-ether gives 5.1 g. of 2-amino-5-endo-(2-imidazolyl)bicyclo[2.2.2]octane (m.p. 158°–160°).

EXAMPLE 9

2-Ureido-5-endo-(2-imidazolyl)bicyclo[2.2.2]octane

A mixture of 1.05 g. (10 millimoles) of nitrourea, 25 ml. of ethanol, 8 ml. of 2.5 N sodium hydroxide and 2.64 g. (10 millimoles) of 2-amino-5-endo-(2-imidazolyl)bicyclo[2.2.2]octane is stirred and heated at 60°–70° for 2 hours. The mixture is filtered and concentrated yielding a 3.6 g. residue, which on recrystallization from hot water gives 0.86 g. of 2-ureido-5-endo-(2-imidazolyl)-bicyclo[2.2.2]octane (m.p. 228°–230° C.).

Alternatively, a mixture of 4.65 g. of 2-amino-5-endo-(2-imidazolyl)bicyclo[2.2.2]octane and 6 g. of urea is heated at 132°–137° C. for 20 minutes. The melt is cooled, triturated with a mixture of chloroform and water, and filtered, yielding 2.82 g. of 2-ureido-5-endo-(2-imidazolyl)-bicyclo[2.2.2]octane (m.p. 220°–232° C.).

EXAMPLE 10

2-Cyanomethylidenyl-5-endo-(2-imidazolyl)bicyclo[2.2.2]-octane

A suspension of 18 g. (0.4 mole) of a 55 percent sodium hydride dispersion in 200 ml. of anhydrous dimethylformamide is stirred under nitrogen and cooled in an ice-bath while 71.5 g. (0.4 mole) of diethyl cyanomethylphosphonate in 100 ml. of dimethylformamide is added in the course of 15–25 minutes. Next, 19 g. (0.1 mole) of 2-keto-5-endo-(2-imidazolyl)bicyclo[2.2.2]octane in 100 ml. of dimethylformamide is added dropwise at room temperature. After a reaction period of 2 hours, 100 ml. of water is added slowly and the mixture is poured into 2 liters of water. The aqueous phase is extracted three times with chloroform and the combined extracts are extracted with 500 ml. of 2.5 N hydrochloric acid. The acid extract is washed with chloroform, made alkaline with concentrated ammonium hydroxide and extracted three times with chloroform. The chloroform extracts are dried over magnesium sulfate, filtered, and concentrated under reduced pressure. Trituration of the residue with ether yields 24.6 g. of 2-cyanomethylidenyl-5-endo-(2-imidazolyl)bicyclo[2.2.2]octane (m.p. 130°–168° C.).

EXAMPLE 11

2-Cyanomethyl-5-endo-(2-imidazolyl)bicyclo[2.2.2]octane

A solution of 213 mg. (1 millimole) of 2-cyanomethylidenyl-5-endo-(2-imidazolyl)bicyclo[2.2.2]octane in 15 ml. of methanol is reduced over 0.1 g. of 5 percent palladiumon-carbon at room temperature. After 4 hours, the mixture is filtered and concentrated under reduced pressure. The residue is recrystallized from hot benzene yielding 140 mg. of 2-cyanomethyl-5-endo-(2-imidazolyl)bicyclo[2.2.2]octane (m.p. 148°–150° C.).

EXAMPLE 12

2-(β-Aminoethyl)-5-endo-(2-imidazolyl)bicyclo[2.2.2]octane

A solution of 10 g. (46.5 millimoles) of 2-cyanomethyl-5-endo-(2-imidazolyl)bicyclo[2.2.2]octane in 500 ml. of N hydrochloric acid is reduced over 5 g. of platinum at room temperature. After 2½ hours, the mixture is filtered and concentrated under reduced pressure. The residue is triturated with ether and taken up in water. The solution is made alkaline with 2.5 N sodium hydroxide and extracted with chloroform. The extract is concentrated under reduced pressure, and the residue is recrystallized from chloroform-ether yielding 6.6 g. of 2-(β-aminoethyl)-5-endo-(2-imidazolyl)bicyclo[2.2.2]octane (m.p. 125°–135° C.).

EXAMPLE 13

2-(2-Imidazolylmethyl)-5-endo-(2-imidazolyl)bicyclo-[2.2.2]octane

A solution of 5 g. of 2-cyanomethyl-5-endo-(2-imidazolyl)bicyclo[2.2.2]octane in 100 ml. of methanol is cooled and saturated with anhydrous hydrogen chloride. After several days, the mixture is concentrated under reduced pressure and triturated with ether yielding a 9.1 g. residue which is treated with 3.6 g. of diethyl β-aminoacet-aldehyde acetal in 10 ml. of methanol. After 1 hour, the mixture is concentrated and the residue is heated to 120° C. in a mixture of 35 ml. of acetic acid and 14 ml. of acetic anhydride for 1½ hours. The mixture is concentrated at reduced pressure, and the residue is taken up in 100 ml. of N hydrochloric acid. After the acid solution is extracted with chloroform, the pH is adjusted to 12 with sodium hydroxide, and the product is extracted with chloroform. The extract is concentrated under reduced pressure yielding a 3.2 g. residue which is purified by chromatography on 32 g. of silica gel packed in methylene chloride. After the column is washed with 2 percent methanol in methylene chloride, the product is eluted with 4 percent methanol in methylene chloride yielding a 0.45 g. residue. Recrystallization of the residue from methanol-ether yields 117 mg. of 2-(2-imidazolymethyl)-5-endo-(2-imidazolyl)bicyclo[2.2.2]octane (m.p. 257°–262° C., Dec.).

EXAMPLE 14

2-Acetonyl-5-endo-(2-imidazolyl)bicyclo[2.2.2]octane

A solution of 13.5 g. of 2-cyanomethyl-5-endo-(2-imidazolyl)bicyclo[2.2.2]octane in 375 ml. of 1,2-dimethoxyethane is added dropwise under nitrogen to 250 ml. of 1.62 M methyllithium in ether. When addition is complete, the mixture is warmed for 2 hours, cooled, and treated, dropwise, with 250 ml. of 2.5 N hydrochloric acid. After one-half hour, the mixture is made alkaline with concentrated ammonium hydroxide and extracted with chloroform. The extract is dried over magnesium sulfate, filtered, and concentrated under reduced pressure yielding a 14.8 g. residue. The product is purified by chromatography on 180 g. of silica gel packed in methylene chloride. After starting material is removed by elution with 0.5 percent methanol in methylene chloride, the product is eluted with 1 percent methanol in methylene chloride yielding a 6.2 g. residue. A second purification of the product by chromatography on silica gel yields 6 g. of 2-acetonyl-5-endo-(2-imidazolyl)-bicyclo[2.2.2]octane (m.p. 130°–137° C.).

EXAMPLE 15

2-Carbethoxymethylidenyl-5-endo-(2-imidazolyl)bicyclo-[2.2.2]octane

A solution of 31.7 g. (135 millimoles) of triethyl phosphonoacetate in 75 ml. of dimethylformamide is added dropwise under nitrogen to a cooled suspension of 6.1 g. (135 millimoles) of a 55% sodium hydride dispersion in 75 ml. of dimethylformamide. After one-half hour, 8.55 g. (45 millimoles) of 2-keto-5-endo-(2-imidazolyl)bicyclo[2.2.2]-octane in 75 ml. of dimethylformamide is added dropwise. At the end of the addition, the mixture is heated at 110° for 1 hour, poured into water, and extracted five times with chloroform. The combined extracts are then extracted five times with 200 ml. portions of 2.5 N hydrochloric acid. The acid extracts are made alkaline with ammonium hydroxide and the product is extracted with chloroform. The chloroform solution is dried over magnesium sulfate, filtered, and concentrated under reduced pressure, and the residue is triturated with ether yielding 7.9 g. of 2-carbethoxymethylidenyl-5-endo-(2-imidazolyl)bicyclo[2.2.2]-octane (m.p. 175°–180° C.).

EXAMPLE 16

2-Carbethoxymethyl-5-endo-(2-imidazolyl)bicyclo[2.2.2]-octane

A solution of 13 g. (50 millimoles) of 2-carbethoxymethylidenyl-5-endo-(2-imidazolyl)bicyclo[2.2.2]-octane in 300 ml. of ethanol is reduced over 6 g. of 5 percent palladium-on-carbon. The mixture is filtered and concentrated under reduced pressure, and the residue is recrystallized from ether-petroleum ether yielding 10.2 g. of 2-carbethoxymethyl-5-endo-(2-imidazolyl)bicyclo[2.2.2]octane (m.p. 100°–102° C.).

EXAMPLE 17

2-(β-Hydroxyethyl)-5-endo-(2-imidazolyl)bicyclo[2.2.2]octane

A solution of 17 g. (65 millimoles) of 2-carbethoxymethyl-5-endo-(2-imidazolyl)bicyclo[2.2.2]octane in 225 ml. of 1,2-dimethoxyethane is added dropwise to a stirred suspension of 17 g. of lithium aluminum hydride in 500 ml. of 1,2-dimethoxyethane. After 2 hours, excess lithium aluminum hydride is decomposed with methanol, and the mixture is diluted with one liter of water. The mixture is extracted with chloroform and the extract is concentrated under reduced pressure yielding a 14.5 g. residue. The product is triturated with warm chloroform and recrystallized from methanol-ether yielding 9.1 g. of 2-(β-hydroxyethyl)-5-endo-(2-imidazolyl)bicyclo[2.2.2]octane (m.p. 173°–179° C.).

EXAMPLE 18

2-(β-Mercaptoethyl)-5-endo-(2-imidazolyl)bicyclo[2.2.2]-octane

A mixture of 5 g. (23 millimoles) of 2-(β-hydroxy-ethyl)-5-endo-(2-imidazolyl)bicyclo[2.2.2]octane, 5 g. of thiourea and 87 ml. of 48 percent hydrobromic acid is heated at 130°–135° C. overnight. The mixture is concentrated under reduced pressure and the residue is heated under reflux in 110 ml. of 2.5 N sodium hydroxide overnight. The cooled mixture is extracted with chloroform and the extract is dried over magnesium sulfate, filtered, and concentrated under reduced pressure yielding a 6.3 g. residue. The product is adsorbed on 60 g. of silica gel packed in methylene chloride and eluted with 1 percent methanol in methylene chloride yielding 5.1 g. of product. The product is recrystallized from chloroform-petroleum ether yielding 4.1 g. of 2-(β-mercaptoethyl)-5-endo-(2-imidazolyl)bicyclo-[2.2.2]octane (m.p. 101°–103° C.).

EXAMPLE 19

2-Carbamylmethylidenyl-5-endo-(2-imidazolyl)bicyclo-[2.2.2]octane

A solution of 39 g. (0.2 mole) of diethyl carbamylmethylphosphonate [prepared according to the procedure outlined in A. J. Speziale and R. C. Freeman, J. Org. Chem. 23, 1883 (1958)] in 250 ml. of dimethylformamide is added dropwise under nitrogen to a cooled, stirred suspension of 8 g. (0.2 mole) of a 60 percent sodium hydride dispersion in 175 ml. of dimethylformamide. After 15 minutes, a solution of 19 g. (0.1 mole) of 2-keto-5-endo-(2-imidazolyl)bicyclo-[2.2.2]octane in 250 ml. of dimethylformamide is added in the course of 45 minutes. After 15 minutes, the mixture is heated at 80° C. for 1½ hours and concentrated under reduced pressure. The residue is taken up in 180 ml. of hot water and the mixture is filtered through a small pad of Super-Cel. The aqueous phase is diluted with 50 ml. of methylene chloride and a precipitate separates. The methylene chloride phase is separated and concentrated under reduced pressure and the residue is combined with the precipitated phase yielding 17 g. of product. The product is recrystallized from ethanol-methylene chloride yielding 11.9 g. of 2-carbamylmethylidenyl-5-endo-(2-imidazolyl)-bicyclo[2.2.2]octane (m.p. 219°–222° C.).

EXAMPLE 20

2-Benzoylmethylidenyl-5-endo-(2-imidazolyl)bicyclo-[2.2.2]octane

A solution of 20.6 g. (80 millimoles) of diethyl benzoylmethylphosphonate [prepared according to the procedure outlined in I. J. Borowitz, M. Anschel, and S. Firstenberg, J. Org. Chem. 32, 1723 (1967)] in 25 ml. of dimethylformamide is added dropwise under nitrogen to a suspension of 3.2 g. (80 millimoles) of a 60 percent sodium hydride dispersion in 25 ml. of dimethylformamide. After 15 minutes, 7.6 g. (40 millimoles) of 2-keto-5-endo-(2-imidazolyl)bicyclo[2.2.2]octane in 25 ml. of dimethylformamide is added dropwise. After one-half hour, the mixture is heated under reflux for 4 hours, concentrated under reduced pressure, and treated with 100 ml. of water. The aqueous phase is decanted and the residue is taken up in chloroform. The chloroform solution is dried over magnesium sulfate, filtered, and concentrated under reduced pressure, and the residue is triturated with petroleum ether. The 5.8 g. residue is purified by adsorption on 70 g. of silica gel packed in methylene chloride and elution with 1% methanol-methylene chloride yields 4.1 g. of 2-benzoylmethylidenyl-5-endo-(2-imidazolyl)bicyclo[2.2.2]octane (m.p. 175°–178° C.).

EXAMPLE 21

2-(p-Methoxybenzylidenyl)-5-endo-(2-imidazolyl)bicyclo-[2.2.2]octane

A mixture of 7.7 g. (30 millimoles) of diethyl p-methoxybenzylphosphonate [prepared according to the procedure outlined in B. E. Ivanov and L. A. Valitova, Izv. Akad. Nauk SSR, Ser. Khim. Nauk (6), 1049 (1963), C. A. 59, 7555d (1963)] and 1.9 g. (10 millimoles) of 2-keto-5-endo-(2-imidazolyl)bicyclo[2.2.2]octane in 15 ml. of dimethylformamide is added dropwise under nitrogen to a warm (80° C.) suspension of 1.3 g. (33 millimoles) of a 60 percent sodium hydride dispersion in 10 ml. of dimethylformamide in the course of 45 minutes. After 30 minutes, the mixture is diluted with 50 ml. of water and extracted with chloroform. The chloroform extract is concentrated under reduced pressure, and the residue is taken up in 2.5 N hydrochloric acid and washed with ether. The acid solution is made alkaline with ammonium hydroxide, and the product is extracted with chloroform. The extract is dried over magnesium sulfate, filtered, and concentrated under reduced pressure. The residue is purified by adsorption on 50 g. of silica gel packed in methylene chloride and elution with 1-2% methanol in methylene chloride yields 1.15 g. of 2-(p-methoxybenzylidenyl)-5 -endo-(2-imidazolyl)bicyclo[2.2.2]-octane (m.p. 145°–160° C.).

EXAMPLE 22

2-(p-Methoxybenzyl)-5-endo-(2-imidazolyl)bicyclo[2.2.2]-octane

A solution of 1 g. (3.4 millimoles) of 2-(p-methoxybenzylidenyl)-5-endo-(2-imidazolyl)bicyclo-[2.2.2]-octane in 20 ml. of methanol is reduced over 5 percent palladium-on-carbon at room temperature. The mixture is filtered and concentrated and the residue is recrystallized from chloroform-ether-petroleum ether yielding 800 mg. of 2-(p-methoxybenzyl)-5-endo-(2-imidazolyl)bicyclo[2.2.2]octane (m.p. 174° C.) (transition 155°).

EXAMPLE 23

3-endo-Hydroxy-5-endo-carboxybicyclo[2.2.2]octane Lactone

The procedures described in K. Alder and G. Stein, Ann Chem. 514, 197 (1934) or W. R. Boehme, E. Schipper, W. G. Scharf and J. Nichols, J. Amer. Chem. Soc. 80, 5488 (1958), are followed with the following modifications: 100 grams of bicyclo[2.2.2]2-ene-5-carboxylic acid [following the procedures outlined in R. Seka and O. Tramposh, Chem. Ber. 75, 1379 (1942); K. Alder and G. Stein, Ann Chem. 514, 197 (1934) or W. R. Boehme, E. Schipper, W. G. Scharf and J. Nichols, J. Amer. Chem. Soc. 80, 5488 (1958)] in 720 ml. of 30 percent (v/v) sulfuric acid is stirred and heated at 110° C. for 1 hour. The mixture is cooled, poured onto ice, and extracted with chloroform. The extract is washed with 10 percent sodium bicarbonate, dried over magnesium sulfate, filtered, and concentrated under reduced pressure yielding 74.3 g. of 3-endo-hydroxy-5-endo-carboxybicyclo-[2.2.2]octane lactone (m.p. 207°–208° C.).

EXAMPLE 24

3-endo-Hydroxy-5-endo-carbamylbicyclo[2.2.2]octane

A solution of 500 mg. of 3-endo-hydroxy-5-endocarboxybicyclo[2.2.2]octane lactone in 10 ml. of methanol and 10 ml. of liquid ammonia is heated at 110° for 12 hours. The reaction mixture is concentrated under reduced pressure, and the residue is recrystallized from hot chloroformpetroleum ether yielding 500 mg. of 3-endo-hydroxy-5-endocarbamylbicyclo[2.2.2]octane (m.p. 188.5°–189° C.).

EXAMPLE 25

3-Keto-5-endo-carbamylbicyclo[2.2.2]octane

A solution of 28.6 g. of chromium trioxide in 385 ml. of 90 percent acetic acid is added dropwise in the course of 2 hours to a stirred solution of 40 g. of 3-endohydroxy-5-endo-carbamylbicyclo[2.2.2]octane in 385 ml. of acetic acid. After being stirred overnight, the mixture is concentrated under reduced pressure, diluted with 300 ml. of water and extracted continuously overnight with chloroform. The extract is dried over magnesium sulfate, filtered, and concentrated under reduced pressure yielding 26.3 g. of crystalline product that is used in the next step. Recrystallization of a small sample of the product from methanol-ether gives 3-keto-5-endo-carbamylbicyclo-[2.2.2]octane (m.p. 183°–184° C.).

EXAMPLE 26

3-Keto-5-endo-cyanobicyclo[2.2.2]octane

A mixture of 1.15 g. (7 millimoles) of 3-keto-5-endo-carbamylbicyclo[2.2.2]octane and 1.45 g. (7.7 millimoles) of p-toluenesulfonyl chloride in 5 ml. of pyridine is heated at 80° C. for 2 hours. The mixture is diluted with 5 ml. of water and concentrated. The residue is taken up in chloroform, and the solution is concentrated. After taking the residue up in chloroform and concentrating the solution a second time, the same procedure is repeated with benzene. The residue is then triturated with benzene and the mixture is filtered. The benzene extract is concentrated and the residue is recrystallized from chloroformpetroleum ether yielding 0.55 g. of 3-keto-5-endo-cyanobicyclo[2.2.2]octane (m.p. 145°–152° C.) (subl. 90°–130 C.).

EXAMPLE 27

3-Keto-5-endo-carbiminomethoxybicyclo[2.2.2]octane Hydrochloride

A solution of 250 mg. of 3-keto-5-endo-cyanobicyclo[2.2.2]octane and 100 mg. of methanol in 5 ml. of ether is cooled and saturated with anhydrous hydrogen chloride. The next day, the mixture is poured into 100 ml. of ether and filtered, yielding 220 mg. of 3-keto-5-endo-carbiminomethoxybicyclo[2.2.2]octane hydrochloride (m.p. 170°–175° C.).

EXAMPLE 28

3-Keto-5-endo-(2-imidazolyl)bicyclo[2.2.2]octane

A solution of 107 g. (0.49 mole) of 3-keto-5-endo-carbiminomethoxybicyclo[2.2.2]octane hydrochloride in 240 ml. of methanol is added dropwise in the course of 45 minutes to 144 g. (1.08 moles) of β-aminoacetaldehyde diethyl acetal at 55°–60 C. The mixture is stirred at room temperature for 1 hour and concentrated under reduced pressure yielding a 239 g. residue. The product is dissolved in one liter of 6 N hydrochloric acid and heated under reflux for 1 hour. The solution is cooled, extracted with chloroform, made alkaline with concentrated ammonium hydroxide and extracted with chloroform. Concentration of the latter yields a 60 g. residue that is purified by adsorption on 550 g. of silica gel packed in methylene chloride. Elution with 4 percent methanol-methylene chloride and recrystallization from methylene chloride-ether yields 37.1 g. of 3-keto-5-endo-(2-imidazolyl)bicyclo[2.2.2]octane (m.p. 144°–147° C.).

EXAMPLE 29

3-Hydroxy-5-endo-(2-imidazolyl)bicyclo[2.2.2]octane

A solution of 19 g. of 3-keto-5-endo-(2-imidazolyl)bicyclo[2.2.2]octane in 250 ml. of methanol is reduced over 4 tbsps. of Raney nickel under 1,950 lbs./in.$^2$ of hydrogen at room temperature. The mixture is filtered, and the filtrate is concentrated under reduced pressure yielding an 18.5 g. residue. Recrystallization of the product from 750 ml. of hot acetone yields 7.5 g. of 3-hydroxy-5-endo-(2-imidazolyl)bicyclo[2.2.2]octane (m.p. 175°–177° C.). Purification of the residue from the filtrate by adsorption on silica gel packed in methylene chloride and elution with 1 percent methanol in methylene chloride yields an additional 2.9 g. of crystalline product.

EXAMPLE 30

3-Amino-5-endo-(2-imidazolyl)bicyclo[2.2.2]octane

A solution of 20 g. of 2-keto-5-endo-(2-imidazolyl)bicyclo[2.2.2]octane and 20 g. of $NH_2OH \cdot HCl$ in 300 ml. of ethanol is heated under reflux for 1 hour and concentrated under reduced pressure. The product is taken up in 200 ml. of water and the solution is made alkaline with concentrated ammonium hydroxide. The oxime is isolated by chloroform extraction, and after the extract is concentrated, the product is precipitated with ether yielding 18 g. of 3-oximino-5-endo-(2-imidazolyl)bicyclo[2.2.2]octane. This compound is reduced in 500 ml. of N hydrochloric acid over 5 g. of platinum under 40 lbs./in.$^2$ of hydrogen at room temperature. The mixture is filtered and the pH of the solution is adjusted to 12–14. Nine extractions of the mixture with chloroform yields 15 g. of product, which, on trituration with ether gives 8 g. of 2-amino-5-endo-(2-imidazolyl)bicyclo[2.2.2]octane (m.p. 125°–140° C.).

EXAMPLE 31

3-Cyanomethylidenyl-5-endo-(2-imidazolyl)bicyclo[2.2.2]octane

A solution of 1.6 g. (9 millimoles) of diethyl cyanomethylphosphonate in 3 ml. of dimethylformamide is added dropwise under nitrogen to a cooled suspension of 360 mg. (9 millimoles) of a 60 percent sodium hydride dispersion in 3 ml. of dimethylformamide. After 15 minutes, a solution of 570 mg. (3 millimoles) of 3-keto-5-endo-(2-imidazolyl)bicyclo[2.2.2]8 ml. of dimethylformamide is added dropwise, and after 15 minutes, the mixture is heated at 100° C. for 1 hour. The mixture is poured into 50 ml. of water and extracted with chloroform. The chloroform solution is washed with water and extracted with 2.5 N hydrochloric acid. The acid solution is made alkaline with ammonium hydroxide and extracted with chloroform. The chloroform extract is dried over magnesium sulfate, filtered, and concentrated under reduced pressure yielding a 0.5 g. residue, which, on recrystallization from methanol, gives 50 mg. of 3-cyanomethylidenyl-5-endo-(2-imidazolyl)-bicyclo[2.2.2] octane (m.p. 240°–244° C., dec.).

EXAMPLE 32

3-(β-Aminoethyl)-5-endo-(2-imidazolyl)bicyclo[2.2.2]octane

A solution of 685 mg. of 3-cyanomethylidenyl-5-endo-(2-imidazolyl)bicyclo[2.2.2]octane in 20 ml. of N hydrochloric acid is reduced over 400 mg. of platinum under 40 lbs./in.$^2$ of hydrogen at room temperature. The solution is made alkaline with 2.5 N sodium hydroxide and extracted three times with chloroform. Concentration of the chloroform extract yields 600 mg. of material which, on recrystallization from chloroform-ether, gives 270 mg. of 3-(β-aminoethyl)-5-endo-(2-imidazolyl)bicyclo[2.2.2]octane (m.p. 146°–149° C.).

EXAMPLE 33

3-Carbethoxymethylidenyl-5-endo-(2-imidazolyl)bicyclo-[2.2.2]octane

A solution of 2 g. (9 millimoles) of triethyl phosphonoacetate in 4 ml. of dimethylformamide is added dropwise under nitrogen to a cooled suspension of 360 mg. (9 millimoles) of a 60 percent sodium hydride dispersion in 3 ml. of dimethylformamide. After 15 minutes, a solution of 570 mg. (3 millimoles) of 3-keto-5-endo-(2-imidazolyl)bicyclo-[2.2.2]octane in 8 ml. of dimethylformamide is added dropwise. After 30 minutes, the mixture is heated at 100°–105° for 1½ hours, poured into 50 ml. of water, and extracted with chloroform. The chloroform extract is concentrated under reduced pressure, and the residue is taken up in 2.5 N hydrochloric acid. The acid extract is made alkaline with ammonium hydroxide and extracted with chloroform. Concentration of the chloroform extract yields a 0.4 g. residue, which, on recrystallization from methanol-chloroform, yields 295 mg. of 3-carbethoxymethylidenyl-5-endo-(2-imidazolyl)bicyclo[2.2.2]octane (m.p. 165°–170° C.).

EXAMPLE 34

3-Carbethoxymethyl-5-endo-(2-imidazolyl)bicyclo[2.2.2]-octane

A solution of 1 g. (3.8 millimoles) of 3-carb-ethoxymethylidenyl-5-endo-(2-imidazolyl)bicyclo[2.2.2]octane in 20 ml. of 2.5 N hydrochloric acid is reduced over 0.5 g. of platinum under 40 lbs./in.$^2$ of hydrogen at room temperature. The mixture is filtered, made alkaline with ammonium hydroxide and extracted with chloroform. Concentration of the extract yields a 0.65 g. residue, which, on recrystallization from chloroform-ether-petroleum ether yields 0.36 g. of 3-carbethoxymethyl-5-endo-(2-imidazolyl)bicyclo-[2.2.2]octane (m.p. 142°–144° C.).

EXAMPLE 35

3-(β-Hydroxyethyl)-5-endo-(2-imidazolyl)bicyclo[2.2.2]-octane

A solution of 200 mg. of 3-carbethoxymethyl-5-endo-(2-imidazolyl)bicyclo[2.2.2]octane in 4 ml. of 1,2-dimethoxyethane is added dropwise under nitrogen to a cooled suspension of 200 mg. of lithium aluminum hydride in 1,2-dimethoxyethane. After 2 hours, methanol is added to decompose unreacted lithium aluminum hydride, and the mixture is diluted with water and extracted with chloroform. The chloroform extract is concentrated under reduced pressure, and the residue is taken up in 2.5 N hydrochloric acid and precipitated with ammonium hydroxide yielding 81 mg. of 3-(β-hydroxyethyl)-5-endo-(2-imidazolyl)bicyclo-[2.2.2]octane (m.p. 160°–166° C.).

EXAMPLE 36

3-(β-Mercaptoethyl)-5-endo-(2-imidazolyl)bicyclo[2.2.2]-octane

A mixture of 2.4 g. (11 millimoles) of 3-(β-hydroxyethyl)-5-endo-(2-imidazolyl)bicyclo[2.2.2]octane and 2.5 g. (33 millimoles) of thiourea in 45 ml. of 48 percent hydrobromic acid is heated at 130° C. overnight. The mixture is concentrated under reduced pressure, and the residue is heated under reflux in 55 ml. of 2.5 N sodium hydroxide overnight. The product is isolated by extraction with chloroform and purified by adsorption on 25 g. of silica gel packed in methylene chloride and elution with 2 percent methanol in methylene chloride yielding 0.45 g. of 3-(β-mercapto-ethyl)-5-endo-(2-imidazolyl)bicyclo[2.2.2]octane (m.p. 130°–160° C.).

EXAMPLE 37

3-Carbamylmethylidenyl-5-endo-(2-imidazolyl)bicyclo-[2.2.2]octane

A solution of 20 g. of 3-cyanomethylidenyl-5-endo-(2- imidazolyl)bicyclo[2.2.2]octane in 100 ml. of concentrated sulfuric acid is allowed to stand overnight. The solution is poured onto ice, concentrated ammonium hydroxide is added to pH 12, and the product is extracted with chloroform containing 20 percent methanol. Concentration of the extract yields a 4.6 g. residue, which, after trituration with methylene chloride, yields 3.6 g. of 3-carbamylmethylidenyl-5-endo-(2-imidazolyl)bicyclo[2.2.2]octane (m.p. 204°–212° C.).

EXAMPLE 38

3-Carbamylmethyl-5-endo-(2-imidazolyl)bicyclo[2.2.2]-octane

A solution of 3.3 g. of 3-carbethoxymethyl-5-endo-(2-imidazolyl)bicyclo[2.2.2]octane in 100 ml. of methanol and 100 ml. of liquid ammonia is heated for 8 hours at 120° C. The mixture is concentrated under reduced pressure and the residue is crystallized from 10 ml. of methylene chloride yielding 0.9 g. of 3-carbamylmethyl-5-endo-(2-imidazolyl)bicyclo[2.2.2]octane (m.p. 235°–238° C., dec.).

EXAMPLE 39

3-Cyanomethyl-5-endo-(2-imidazolyl)bicyclo[2.2.2]octane

A solution of 1.23 g. (5 millimoles) of 3-carb-amylmethyl-5-endo-(2-imidazolyl)bicyclo[2.2.2]octane and 3.2 g. (16 millimoles) of p-toluenesulfonyl chloride in 10 ml. of pyridine is heated at 75° C. for 1½ hours. The mixture is concentrated under reduced pressure, and the residue is taken up in 2.5 N hydrochloric acid. The solution is extracted with ether and made alkaline with concentrated ammonium hydroxide. The precipitated product is washed with methylene chloride and crystallized from methanol-ether yielding 0.5 g. of 3-cyanomethyl-5-endo-(2-imidazolyl)bicyclo[2.2.2]octane (m.p. 210°–215° C.).

EXAMPLE 40

3-Acetonyl-5-endo-(2-imidazolyl)bicyclo[2.2.2]octane

A solution of 0.5 g. (2 millimoles) of 3-cyanomethyl-5-endo-(2-imidazoly)bicyclo[2.2.2]octane in 70 ml. of 1,2-dimethoxyethane is added dropwise to 20 ml. (30 millimoles) of 1.6 M methyl lithium in ether under nitrogen. After the mixture is heated for 3 hours at 45° C. and cooled, 25 ml. of 2.5 N hydrochloric acid is added. After one-half hour, the mixture is made alkaline with concentrated ammonium hydroxide and extracted with chloroform. The extract is concentrated under reduced pressure yielding a 0.5 g. residue that is purified by chromatography on 100 g. of silica gel packed in methylene chloride. Elution with 2 percent methanol in methylene chloride yields 0.3 g. of 3-acetonyl-5-endo-(2-imidazolyl)bicyclo[2.2.2]octane (m.p. 136°–139° C.).

The following examples are representative of the N-substituted imidazolyl compounds of this invention.

EXAMPLE 41

N-Benzyl-5-endo-(2-imidazolyl)bicyclo[2.2.2]-oct-2-ene

A suspension of 349 mg. of 5-endo-(2-imidazolyl)-bicyclo[2.2.2]-oct-2-ene in 15 ml. of ether is cooled in an acetone-carbon dioxide bath and stirred under a nitrogen blanket while 1.3 ml. of 1.6 M butyl lithium in hexane is added. After 30 minutes, the mixture is warmed to room temperature and treated with 253 mg. of benzyl chloride in 5 ml. of ether. 1 hour later, 5 ml. of water and 20 ml. of chloroform are added, and the organic phase is separated, dried over magnesium sulfate, filtered, and concentrated under reduced pressure. The residue is taken up in 3 ml. of benzene and 3 ml. of petroleum ether is added to precipitate starting material. The mixture is filtered and the mother liquors are concentrated to dryness. A short-path distillation of the residue yields 230 mg. of N-benzyl-5-endo-(2-imidazolyl)bicyclo[2.2.2]-oct-2-ene.

EXAMPLE 42

N-Carbomethoxy-5-endo-(2-imidazolyl)bicyclo[2.2.2]-oct-2-ene

Four grams of anhydrous potassium carbonate is added to a stirred solution of 1.7 g. of 5-endo-(2-imidazolyl)bicyclo[2.2.2]-oct-2-ene in 50 ml. of acetone. Next, 0.9 g. of methyl chloroformate is added, and the mixture is stirred overnight. The mixture is filtered, and the filtrate is concentrated under reduced pressure. Short-path distillation of the residue yields 1.6 g. of N-carbomethoxy-5-endo-(2-imidazolyl)bicyclo[2.2.2]-oct-2-ene.

EXAMPLE 43

N-Cyano-5-endo-(2-imidazolyl)bicyclo[2.2.2]-oct-2-ene

One gram of cyanogen bromide is added to a stirred mixture of 1.7 g. of 5-endo-(2-imidazolyl)bicyclo[2.2.2]-oct-2-ene and 2.5 g. of sodium carbonate in benzene. The next day, the reaction mixture is filtered and concentrated under reduced pressure. A short-path distillation of the residue yields 1 g. of N-cyano-5-endo-(2-imidazolyl)bicyclo-[2.2.2]-oct-2-ene.

EXAMPLE 44

N-Difluoromethyl-5-endo-(2-imidazolyl)bicyclo[2.2.2]-oct-2-ene

A solution of 1.7 g. of 5-endo-(2-imidazolyl)-bicyclo[2.2.2]-oct-2-ene in 50 ml. of 1,2-dimethoxyethane is treated with 1.1 g. of potassium t-butoxide. After 15 minutes, the solution is cooled in an ice-bath, and 1.5 g. of t-butanol and 1.1 g. of potassium t-butoxide are added. Next, 3.5 g. of chlorodifluoromethane in 25 ml. of 1,2-dimethoxyethane is added dropwise. The mixture is poured onto ice and extracted with chloroform. The chloroform extract is washed with water, dried over magnesium sulfate, filtered, and concentrated under reduced pressure. Short-path distillation of the residue yields 1.6 g. of N-difluoromethyl-5-endo-(2-imidazolyl)bicyclo[2.2.2]-oct-2-ene.

EXAMPLE 45

2-Keto-3-(p-methoxybenzylidenyl)-5-endo-(2-imidazolyl)-bicyclo[2.2.2]octane

A solution of 1.9 g. (10 millimoles) of 2-keto-5-endo-(2-imidazolyl)bicyclo[2.2.2]octane in 40 ml. of ethanol is stirred, and 15 ml. of 2.5 N sodium hydroxide, 35 ml. of water, and 2.7 g. of p-anisaldehyde are added. After the mixture is stirred overnight, the ethanol is removed under reduced pressure, and the precipitated product is recrystallized from chloroform-ether yielding 1.0 g. of 2-keto-3-(p-methoxybenzylidenyl)-5-endo-(2-imidazoly)bi-cyclo[2.2.2]octane (m.p. 160°–171° C.).

EXAMPLE 46

2-Keto-3-(p-hydroxybenzylidenyl)-5-endo-(2-imidazolyl)-bicyclo[2.2.2]octane

A mixture of 5 g. of 2-keto-3-(p-methoxybenzyl-idenyl)-5-endo-(2-imidazolyl)bicyclo[2.2.2]octane and 15 g. of pyridine hydrochloride are heated at 190°–210° C. for 1 hour. The mixture is cooled and triturated with saturated potassium bicarbonate. Upon the addition of a small volume of chloroform, the slimy residue crystallizes yielding 4 g. of product. Recrystallization of the product from methanol followed by drying at 150° C. at 10 mm., yields 2.1 g. of 2-keto-3-(p-hydroxybenzylidenyl)-5-endo-(2-imidazoly)bicyclo[2.2.2]octane (m.p. 274° C.).

EXAMPLE 47

2-Hydroxy-3-(p-methoxybenzyl)-5-endo-(2-imidazolyl)bicyclo[2.2.2]octane

A solution of 18.3 g. (60 millimoles) of 2-keto-3-(p-methoxybenzylidenyl)-5-endo-(2-imidazolyl)bicyclo-[2.2.2]octane in 350 ml. of methanol is reduced over 5 g. of 5 percent palladium-on-carbon with a resultant hydrogen uptake of 1.6 equivalent. The mixture is filtered, and 30 g. of sodium borohydride is added portionwise to the cooled filtrate. After the addition of concentrated hydrochloric acid and 200 ml. of water, the mixture is concentrated and made alkaline with ammonium hydroxide. The product is isolated by extraction with chloroform, and purified by recrystallization from chloroform-ether yielding 11.0 g. of 2-hydroxy-3-(p-methoxybenzyl)-5-endo-(2-imidazolyl)bi-cyclo[2.2.2]octane (m.p. 192°–196°C.).

EXAMPLE 48

2-Cyanomethylidenyl-3-(p-methoxybenzylidenyl)-5-endo-(2-imidazolyl)bicyclo[2.2.2]octane A solution of 1.62 g. (9 millimoles) of diethyl cyanomethylphosphonate in 2 ml. of dimethylformamide is added dropwise under nitrogen to a cooled suspension of 360 mg. (9 millimoles) of a 60% sodium hydride dispersion in 4 ml. of dimethylformamide. After one-half hour, a solution of 924 mg. (3 millimoles) of 2-keto-3-(p-methoxybenzylidenyl)-5-endo-(2-imidazolyl)bicyclo[2.2.2]octane in 8 ml. of dimethylformamide is added slowly. After one-half hour, the mixture is heated at 100° C. for 1 hour, diluted with 30 ml. of water, and extracted with chloroform. The extract is concentrated under reduced pressure, and the residue is taken up in 25 ml. of 2.5 N hydrochloric acid. The acidic solution is made alkaline with ammonium hydroxide and extracted with chloroform, and the extract is concentrated under reduced pressure yielding a 1 g. residue. Recrystallization of the product from hot methanol yields 163 mg. of 2-cyanomethylidenyl-3-(p-methoxybenzlidenyl)-5-endo-(2-imidazolyl)-bicyclo[2.2.2]octane (m.p. 249°–250° C.).

We claim:
1. A compound of the formula

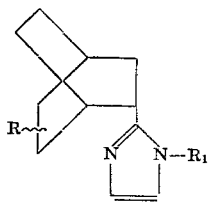

where
R is a double bond between the 2 and 3 positions or a substituent at the 2 or 3 position and is
hydrogen,
hydroxy,
keto,
oximino,
amino,
ureido,
—$CH_2R'$ where R' is
cyano,
aminomethyl,
carbamyl,
carboloweralkoxy,
hydroxymethyl,
mercaptomethyl,
acetyl,
benzoyl,
p-loweralkoxyphenyl,
p-hydroxyphenyl,
2-imidazolyl or
= CHR″ where R″ is
cyano,
carbamyl,
carboloweralkoxy,
benzoyl,
p-loweralkoxyphenyl or
p-hydroxyphenyl; and
$R_1$ is hydrogen,
loweralkyl,
benzyl,
acetyl,
carboloweralkoxy,
cyano or
haloloweralkyl.

2. A compound according to claim 69 in which $R_1$ is hydrogen.

3. A compound according to claim 2 where R is a substituent at the 2-position and the 5-(2-imidazolyl) substituent is in the endo configuration.

4. A compound according to claim 2 where R is a substituent at the 3-position and the 5-(2-imidazolyl) substituent is in the endo configuration.

5. A compound according to claim 3 where R is a double bond between the 2- and 3-positions, thus forming 5-endo-(2-imidazolyl)bicyclo[2.2.2]oct-2-ene.

6. A compound according to claim 2 where R is hydrogen, thus forming 2-(2-imidazolyl)bicyclo[2.2.2]octane.

7. A compound according to claim 3 where R is keto, thus forming 2-keto-5-endo-(2-imidazolyl)bicyclo-[2.2.2]octane.

8. A compound according to claim 3 where R is hydroxy, thus forming 2-hydroxy-5-endo-(2-imidazolyl)bi-cyclo[2.2.2]octane.

9. A compound according to claim 3 where R is oximino, thus forming 2-oximino-5-endo-(2-imidazolyl)bi-cyclo[2.2.2]octane.

10. A compound according to claim 3 where R is amino, thus forming 2-amino-5-endo-(2-imidazolyl)bicyclo-[2.2.2]octane.

11. A compound according to claim 3 where R is ureido, thus forming 2-ureido-5-endo-(2-imidazolyl)bicyclo-[2.2.2]octane.

12. A compound according to claim 3 where R″ is cyano, thus forming 2-cyanomethylidenyl-5-endo-(2-imidazolyl)bicyclo[2.2.2]octane.

13. A compound according to claim 3 where R' is cyano, thus forming 2-cyanomethyl-5-endo-(2-imidazolyl)-bicyclo[2.2.2]octane.

14. A compound according to claim 3 where R' is aminomethyl, thus forming 2-(β-aminoethyl)-5-endo-(2-imidazolyl)bicyclo[2.2.2]octane.

15. A compound according to claim 3 where R' is imidazolyl, thus forming 2-(2-imidazolylmethyl)-5-endo-(2-imidazolyl)bicyclo[2.2.2]octane.

16. A compound according to claim 3 where R' is acetyl, thus forming 2-acetonyl-5-endo-(2-imidazolyl)bi-cyclo[2.2.2]octane.

17. A compound according to claim 3 where R″ is carbethoxy, thus forming 2-carbethoxymethylidenyl-5-endo-(2-imidazolyl)bicyclo[2.2.2]octane.

18. A compound according to claim 3 where R' is carbethoxy, thus forming 2-carbethoxymethyl-5-endo-(2-imidazolyl)bicyclo[2.2.2]octane.

19. A compound according to claim 3 where R' is hydroxymethyl, thus forming 2-(β-hydroxyethyl)-5-endo-(2-imidazolyl)bicyclo[2.2.2]octane.

20. A compound according to claim 3 where R' is mercaptomethyl, thus forming 2-(β-mercaptoethyl)-5-endo-(2-imidazolyl)bicyclo[2.2.2]octane.

21. A compound according to claim 3 where R″ is carbamyl, thus forming 2-carbamylmethylidenyl-5-endo-(2-imidazolyl)bicyclo[2.2.2]octane.

22. A compound according to claim 3 where R″ is benzoyl, thus forming 2-benzoylmethylidenyl-5-endo-(2-imidazolyl)bicyclo[2.2.2]octane.

23. A compound according to claim 3 where R″ is p-methoxyphenyl, thus forming 2-(p-methoxybenzylidenyl)-5-endo-(2-imidazolyl)bicyclo[2.2.2]octane.

24. A compound according to claim 3 where R' is p-methoxyphenyl, thus forming 2-(p-methoxybenzyl)-5-endo-(2—IMIDAZOLYL)bicyclo[2.2.2]octane.

25. A compound according to claim 4 where R is keto, thus forming 3-keto-5-endo-(2-imidazolyl)bicyclo-[2.2.2]octane.

26. A compound according to claim 4 where R is hydroxy, thus forming 3-hydroxy-5-endo-(2-imidazolyl)-bicyclo[2.2.2]octane.

27. A compound according to claim 4 where R is amino, thus forming 3-amino-5-endo-(2-imidazolyl)bicyclo-[2.2.2]octane.

28. A compound according to claim 4 where R'' is cyano, thus forming 3-cyanomethylidenyl-5-endo-(2-imidazolyl)bicyclo[2.2.2]octane.

29. A compound according to claim 4 where R' is aminomethyl, thus forming 3-($\beta$-aminoethyl)-5-endo-(2-imidazolyl)bicyclo[2.2.2]octane.

30. A compound according to claim 4 where R'' is carbethoxy, thus forming 3-carbethoxymethylidenyl-5-endo-(2-imidazolyl)bicyclo[2.2.2]octane.

31. A compound according to claim 4 where R' is carbethoxy, thus forming 3-carbethoxymethyl-5-endo-(2-imidazolyl)bicyclo[2.2.2]octane.

32. A compound according to claim 4 where R' is hydroxymethyl, thus forming 3-($\beta$-hydroxyethyl)-5-endo-(2-imidazolyl)bicyclo[2.2.2]octane.

33. A compound according to claim 4 where R' is mercaptomethyl, thus forming 3-($\beta$-mercaptoethyl)-5-endo-(2-imidazolyl)bicyclo[2.2.2]octane.

34. A compound according to claim 4 where R'' is carbamyl, thus forming 3-carbamylmethylidenyl-5-endo-(2-imidazolyl)bicyclo[2.2.2]octane.

35. A compound according to claim 4 where R' carbamyl, thus forming 3-carbamylmethyl-5-endo-(2-imidazolyl)bicyclo[2.2.2]octane.

36. A compound according to claim 4 where R' is cyano, thus forming 3-cyanomethyl-5-endo-(2-imidazolyl)-bicyclo[2.2.2]octane.

37. A compound according to claim 4 where R' is acetyl, thus forming 3-acetonyl-5-endo-(2-imidazolyl)bi-cyclo[2.2.2]octane.

38. A compound of the formula

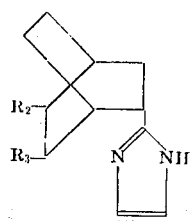

where
R$_2$ is hydroxy,
keto or
cyanomethylidenyl; and
R$_3$ is —CH$_2$R' or =CHR''
where R' and R'' are p-loweralkoxyphenyl or p-hydroxyphenyl.

39. A compound according to claim 38 where the 5-(2-imidazolyl)substituent is in the endo configuration.

40. A compound according to claim 39 where R$_2$ is keto and R$_3$ is (p-methoxybenzylidenyl), thus forming 2-keto-3-(p-methoxybenzylidenyl)-5-endo-(2-imidazolyl)bicyclo[2.2.2]octane.

41. A compound according to claim 39 where R$_2$ is keto and R$_3$ is (p-hydroxybenzylidenyl), thus forming 2-keto-3-(p-hydroxybenzylidenyl)-5-endo-(2-imidazolyl)bicyclo[2.2.2]octane.

42. A compound according to claim 39 where R$_2$ is hydroxy and R$_3$ is (p-methoxybenzyl), thus forming 2-hydroxy-3-(p-methoxybenzyl)-5-endo-(2-imidazolyl)bicyclo[2.2.2]-octane.

43. A compound according to claim 39 where R$_2$ is cyanomethylidenyl and R$_3$ is (p-methoxybenzylidenyl), thus forming 2-cyanomethylidenyl-3-(p-methoxybenzylidenyl)-5-endo-(2-imidazolyl)bicyclo[2.2.2]octane.

* * * * *

UNITED STATES PATENT AND TRADEMARK OFFICE
CERTIFICATE OF CORRECTION

PATENT NO. : 3,666,755
DATED : May 30, 1972
INVENTOR(S) : Arthur F. Wagner et al.

It is certified that error appears in the above-identified patent and that said Letters Patent are hereby corrected as shown below:

Column 6, between lines 30 and 40 - delete the following structure

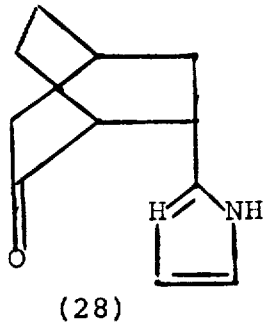   and insert therefor   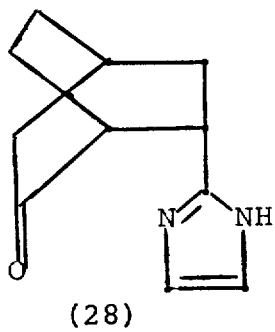

(28)   (28)

Column 8, line 34 - Delete "Heimback" and insert in its place -- Heimbach --.

Column 10, line 49 - Delete "palladiumon" and in its place add "palladium-on".

Column 13, line 66 - Delete "bicyclo[2.2.2]2-ene-5-carboxylic" and in its place add "bicyclo[2.2.2]oct-2-ene-5-carboxylic".

Column 14, line 45 - Delete "90°-130C." and in its place insert "90°-130°C.".

Column 14, line 64 - Delete "55°-60C." and in its place add "55°-60°C.".

Column 15, line 49 - Delete "bicyclo[2.2.2]8 ml." and in its place add "bicyclo[2.2.2]octane in 8 ml.".

Column 18, line 52 - Delete "(m.p. 160°-171°C.)" and in its place add "(m.p. 169°-171°C.)".

Column 20, line 6 - Delete "claim 69" and in its place add "Claim 1"

Signed and Sealed this

Sixth Day of July 1976

[SEAL]

Attest:

RUTH C. MASON
Attesting Officer

C. MARSHALL DANN
Commissioner of Patents and Trademarks